(12) United States Patent
Ohzono

(10) Patent No.: US 7,513,559 B2
(45) Date of Patent: Apr. 7, 2009

(54) VEHICLE

(75) Inventor: Gen Ohzono, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 280 days.

(21) Appl. No.: 11/283,007

(22) Filed: Nov. 18, 2005

(65) Prior Publication Data

US 2006/0113815 A1 Jun. 1, 2006

(30) Foreign Application Priority Data

Nov. 26, 2004 (JP) .............................. 2004-343206

(51) Int. Cl.
*B62J 17/06* (2006.01)
(52) U.S. Cl. .................... 296/78.1; 296/97.22; 280/833
(58) Field of Classification Search .............. 296/180.1, 296/77.1, 78.1, 97.22, 136.1, 146.7; 280/833
See application file for complete search history.

(56) References Cited

U.S. PATENT DOCUMENTS

| | | | | |
|---|---|---|---|---|
| 4,818,012 A | * | 4/1989 | Kohama et al. ............ | 296/78.1 |
| 4,964,484 A | * | 10/1990 | Buell .......................... | 180/219 |
| 5,022,679 A | * | 6/1991 | Pazik .......................... | 280/833 |
| 5,490,549 A | * | 2/1996 | Biette ......................... | 150/167 |
| 5,899,522 A | * | 5/1999 | DeRees et al. ............ | 296/181.2 |
| 6,042,171 A | * | 3/2000 | Hesse ......................... | 296/78.1 |
| 6,120,083 A | * | 9/2000 | Gunther ...................... | 296/78.1 |
| 6,231,104 B1 | * | 5/2001 | Roethel ....................... | 296/78.1 |
| 6,516,844 B1 | * | 2/2003 | Henry ......................... | 150/167 |
| 6,588,529 B2 | * | 7/2003 | Ishii et al. ................... | 180/219 |
| 6,789,835 B2 | * | 9/2004 | Wargin et al. .............. | 296/78.1 |
| 6,923,489 B2 | * | 8/2005 | Keys .......................... | 296/77.1 |
| 6,951,361 B2 | * | 10/2005 | Keys .......................... | 296/77.1 |
| 7,175,222 B2 | * | 2/2007 | Gray et al. ................. | 296/78.1 |
| 7,178,858 B1 | * | 2/2007 | Hesse ....................... | 296/180.1 |

FOREIGN PATENT DOCUMENTS

JP  2003-178651  6/2003

* cited by examiner

*Primary Examiner*—Glenn Dayoan
*Assistant Examiner*—Gregory Blankenship
(74) *Attorney, Agent, or Firm*—Keating & Bennett, LLP

(57) ABSTRACT

A vehicle with a cover member of a simple structure includes a flexible cover body section arranged to cover at least a portion of an on-the-vehicle part. The cover member includes bendable elongated sections extending outward from the edge portions of the cover body section. The vehicle also includes a leg shield for covering a driver's leg in front thereof and an on-the-vehicle part disposed inside the leg shield. The on-the-vehicle part is disposed along the inside surface of the leg shield, and the outside surface of the on-the-vehicle part opposite from the leg shield side is covered by the cover member.

19 Claims, 12 Drawing Sheets

(A)

(B)

VEHICLE

BACKGROUND OF THE INVENTION

1. Field of the Invention

This invention relates to vehicles and particularly to a vehicle provided with a tank or the like such as a reservoir tank for a liquid to be stored therein.

2. Description of the Related Art

For example, a brake switch for a vehicle such as a motorcycle for turning a brake lamp on and off in association with a brake pedal is provided with a switch case having a built-in switch mechanism for turning the brake lamp on and off. In the lower end of the switch case is an annular groove, in which is fitted an annular projection arranged inwardly on the upper end of a bellow boot. See Patent Document JP-A-2003-178651.

However, since the annular projection on the bellow boot is directed inwardly, the annular projection includes an undercut at the time of forming the bellow boot. Therefore, the structure of forming dies for use in forming the bellow boot can be complicated. This problem is not limited to a brake switch for vehicles, but is also true for all the formed products made by forming dies.

SUMMARY OF THE INVENTION

In order to overcome the problems described above, preferred embodiments of the present invention provide a vehicle with a cover member capable of being formed by using forming dies having a simple structure.

A vehicle according to a first preferred embodiment of the present invention includes a cover member having a flexible cover body section covering at least a portion of an on-the-vehicle part, and a bendable elongated section extending outward from the edge portion of the cover body section.

A vehicle according to a second preferred embodiment of the present invention includes a leg shield for covering a driver's leg in front thereof and an on-the-vehicle part disposed inside the leg shield, wherein the on-the-vehicle part is disposed along the inside surface of the leg shield, and the outside surface of the on-the-vehicle part on the opposite side from the side facing the leg shield is covered by a cover member.

In the vehicle according to the first preferred embodiment of the present invention, since an enlarged section extends outward from the edge portion of a cover body section, no elongated section includes an undercut when the cover member is formed by forming dies. As a result, the structure of the forming dies can be simplified. Also, since the elongated section is bendable, the elongated section can be utilized for other purposes if the elongated section is used in the condition of being bent. Further, since the cover body section is flexible, the on-the-vehicle part can be covered reliably regardless of its surface configuration.

In the vehicle according to the second preferred embodiment of the present invention, since the on-the-vehicle part is disposed along the inside surface of a leg shield, the leg shield side surface of the on-the-vehicle part is covered by the leg shield, and the leg shield side surface need not be covered by a cover member. The surface area of the on-the-vehicle part required to be covered by the cover member is decreased in this way, thereby simplifying the shape (configuration) of the cover member. As a result, the structure of forming dies for use in forming the cover member can be simplified.

Other features, elements, characteristics, and advantages will be apparent from the following detailed description of preferred embodiments with reference to the attached drawings.

DETAILED DESCRIPTION OF PREFERRED EMBODIMENTS

Now, description will be made of a vehicle according to a preferred embodiment of the present invention with reference to the drawings.

In the present preferred embodiment, an example will be described in which the present invention is applied to an underbone type motorcycle. It is to be understood that the present invention is not limited to the underbone type motorcycle, but may be applied to vehicles in general.

Figure 1:
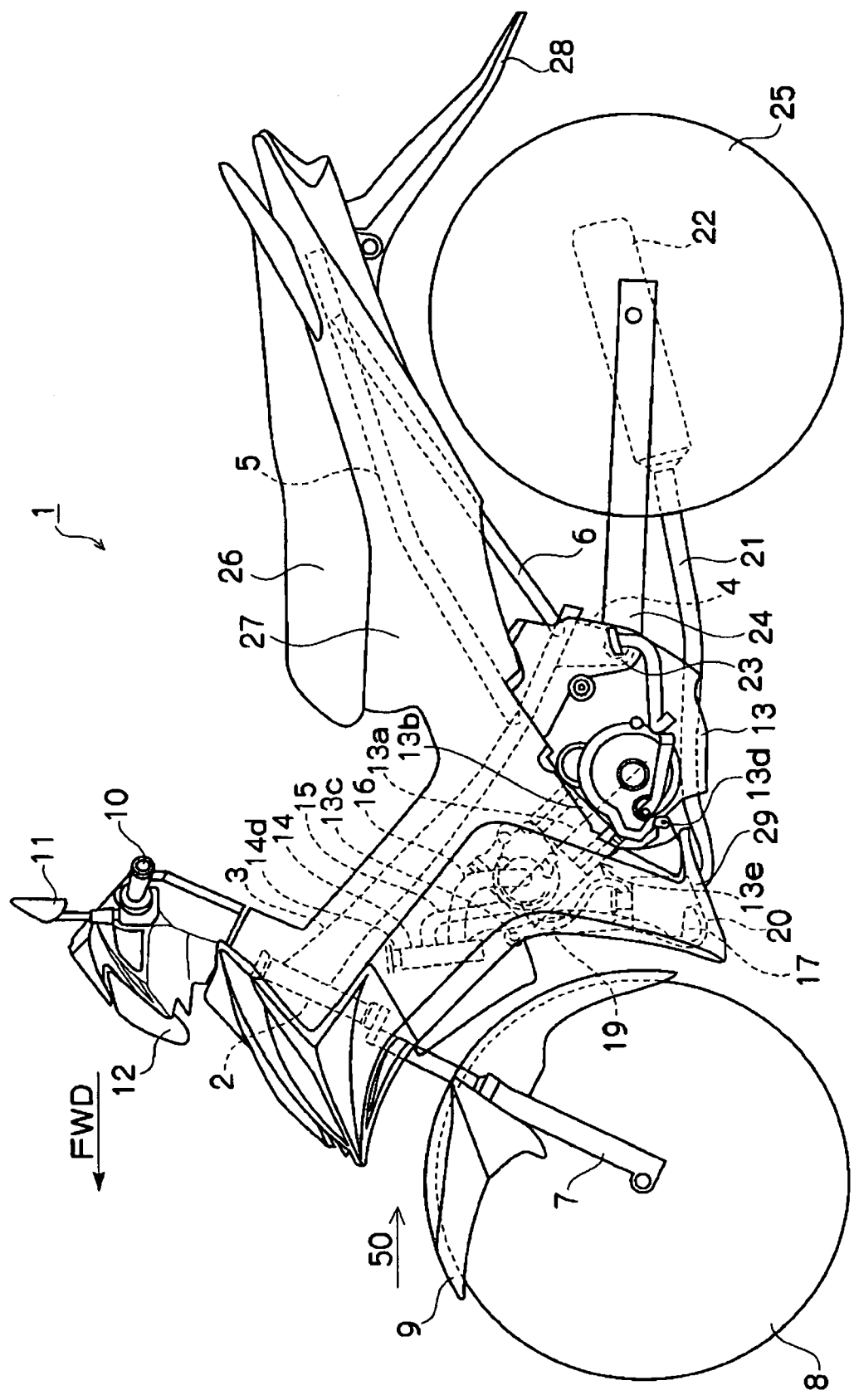
FIG. 1 is a side view, showing the overall structure of a motorcycle according to a preferred embodiment of the present invention.
Figure 2:
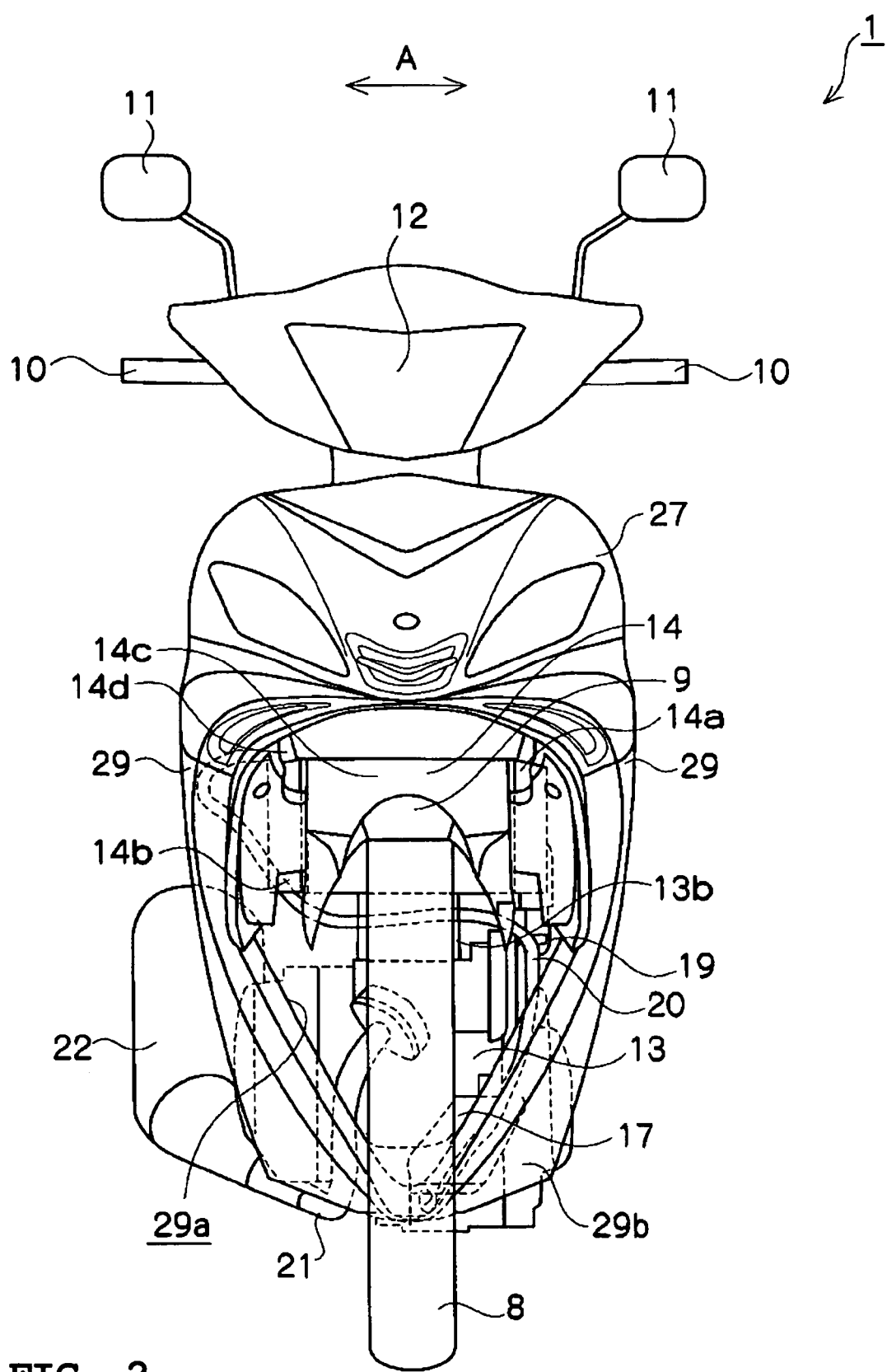
FIG. 2 is a front view of the motorcycle according to the preferred embodiment shown in FIG. 1.

As shown in FIG. 1 and FIG. 2, in an underbone type motorcycle 1, the forward end of a main frame 3 is connected to a head pipe 2. The main frame 3 extends downward and rearward. A rear arm bracket 4 is connected to the rear end of the main frame 3. Also, to the main frame 3 is connected a seat rail 5 extending upward and rearward. Between the rear end of the main frame 3 and the rear portion of the seat rail 5 is connected a backstay 6. The head pipe 2, main frame 3, rear arm bracket 4, seat rail 5, and backstay 6 make up a body frame. The body frame is an example of the "mounting member."

A pair of front forks 7 is disposed downwardly of the head pipe 2. A front wheel 8 is mounted for rotation to the lower ends of the pair of front forks 7. A front fender 9 for covering the front wheel 8 thereabove is disposed above the front wheel 8. Also, upwardly of the head pipe 2 is mounted a handlebar 10 for rotation. Inside the handlebar 10 is attached a rear view mirror 11. Forwardly of and inside the handlebar 10 is disposed a head light 12.

Downwardly of the main frame 3 is provided an engine 13 including a cylinder 13*b* with a cylinder axis 13*a* inclined obliquely upwardly toward the front at a given angle. The engine 13 has a mounting section 13*c* provided on the cylinder 13*b* and a mounting section 13*d* provided further downward than the cylinder 13*b* of the engine 13.

Forwardly and upwardly of the engine 13 and downward of the main frame 3 is provided a radiator 14 for cooling the engine 13. The lower end of the radiator 14 is located at a position above the lower surface 13*e* of the cylinder 13*b* of the engine 13. The radiator 14 is one example of the "thermal exchanger" of the present invention. As shown in FIG. 2, the radiator 14 includes a pair of tank sections 14*a*, 14*b* spaced at a given distance in the lateral direction of the motorcycle 1 (in the direction of arrow A of FIG. 2) and a core section 14*c* disposed between the pair of tank sections 14*a*, 14*b*. The core section 14*c* is provided with numerous holes (not shown) for the passage of a running wind 50 (see FIG. 1). To one tank section 14*b* is attached a cap section 14*d* having a pressure regulating valve (not shown). The radiator 14 is connected to the engine 13 by a feed pipe 15 and a return pipe 16.

When cooling the engine 13 by the radiator 14, the cooling water warmed up by cooling the engine 13 is first sent to the tank section 14*a* of the radiator 14 through the feed pipe 15. The warmed cooling water is cooled by the core section 14*c* of the radiator 14 and thereafter sent to the tank section 14*b* of the radiator 14. The cooled down cooling water is returned to the engine 13 through the return pipe 16. In the core section 14*c* of the radiator 14, a running wind (air) 50 is adapted to hit against the core section 14*c* from the front, pass therethrough, and cool (via radiation) the cooling water.

A reservoir tank 17 is disposed further forward than the engine 13 and on the right side of the body center line when viewed from the front of the vehicle body. The reservoir tank 17 stores as much cooling water as the increased volume of the cooling water due to the elevated water temperature in the radiator 14. Also, the radiator 14 draws by negative pressure as much cooling water as the decreased volume of the cooling water from the reservoir tank 17 due to lowered temperature in the radiator 14, for the filling of the radiator 14. As such, the reservoir tank 17 has the function of keeping the amount of cooling water in the radiator 14 constant. Also, the reservoir tank 17 is preferably made from a semitransparent material, for example, allowing visual recognition from the outside of the amount of cooling water stored therein. That is, the whole reservoir tank 17 includes a transparent member allowing visual recognition from the outside of the amount of cooling water stored therein.

The reservoir tank 17 is connected to the radiator 14 by a feed and drainage pipe 20. Specifically, one end of the feed and drainage pipe 20 is connected to a first connection section 17*f* (see FIG. 5 and FIGS. 6(A) and 6(B)) located at the lower end of the reservoir tank 17 and disposed on the right side of the body center line when viewed from the front of the vehicle body. The other end of the feed and drainage pipe 20 is connected to the cap section 14*d* of the radiator 14 disposed on the left side of the body center line when viewed from the front of the vehicle body.

Figure 5:
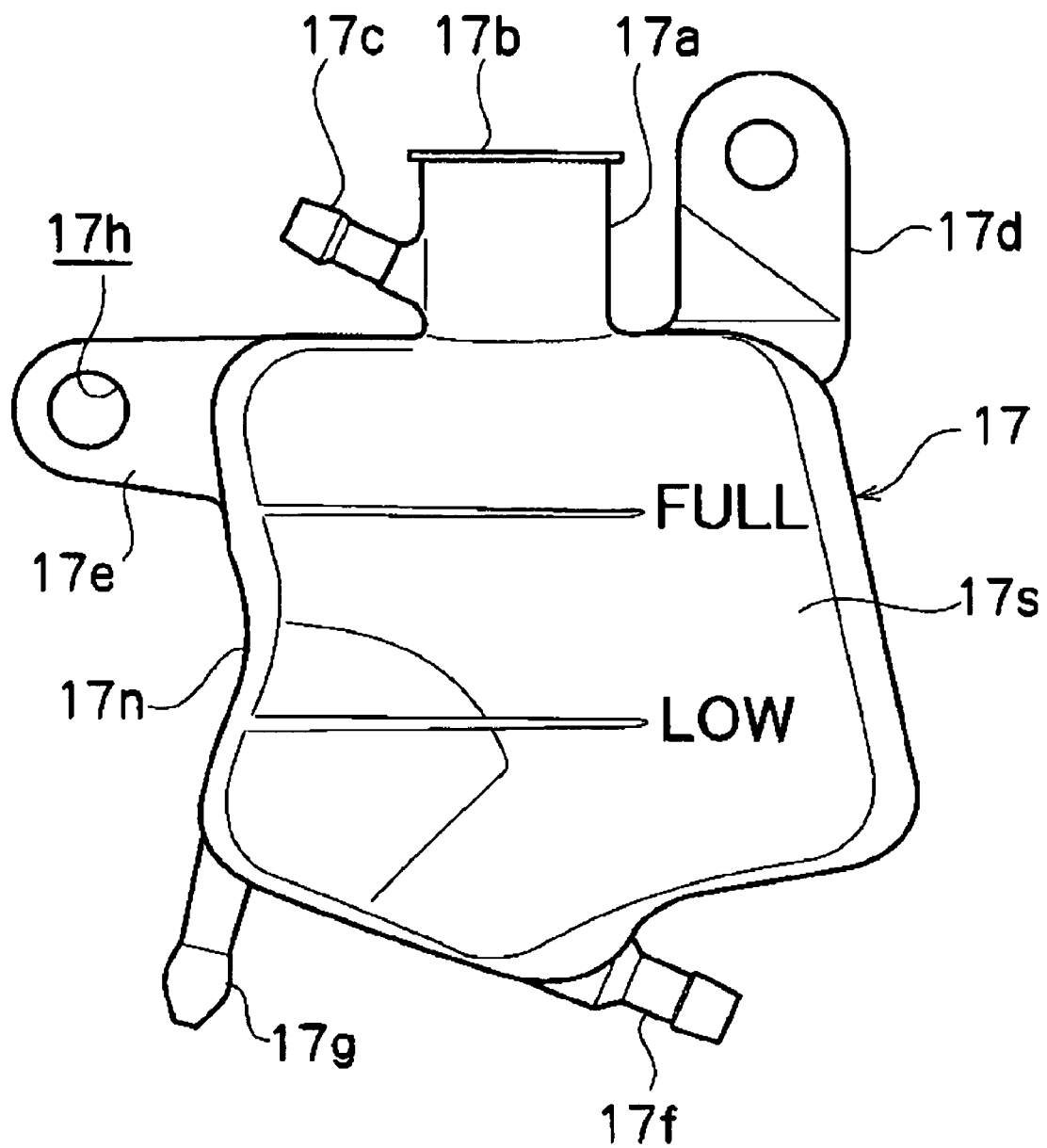
FIG. 5 is a right side view of the reservoir tank used in the motorcycle according to the preferred embodiment shown in FIG. 1.
Figure 6:
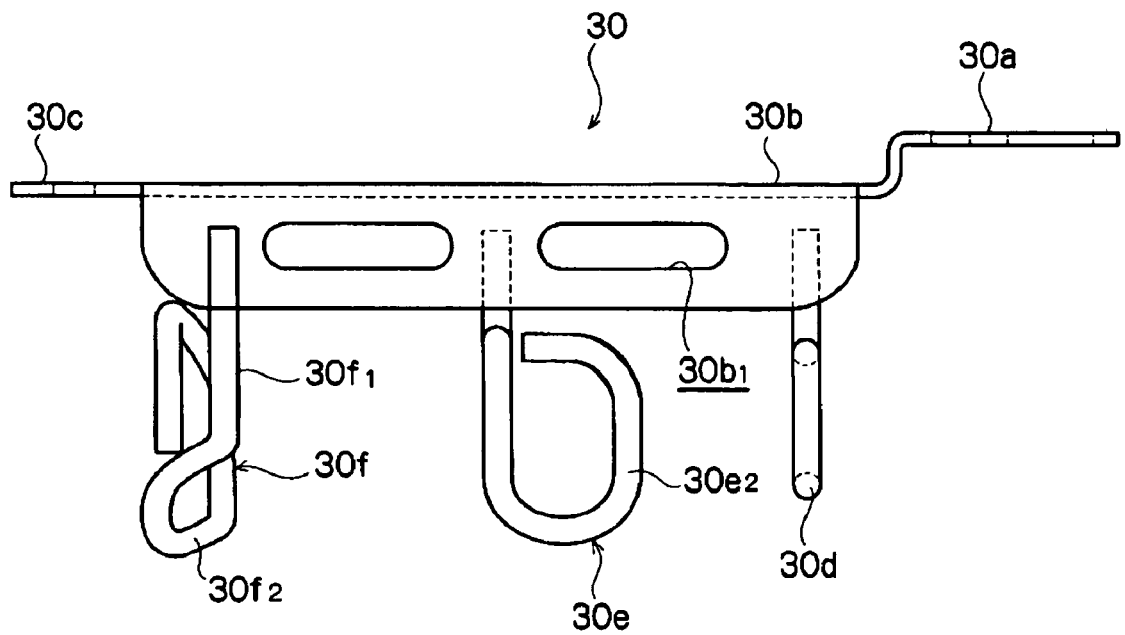
FIG. 6(A) is a plan view of a first bracket for the attachment of the reservoir tank to the vehicle body of the motorcycle according to the preferred embodiment shown in FIG. 1.
FIG. 6(B) is a side view of the first bracket.
Figure 6:
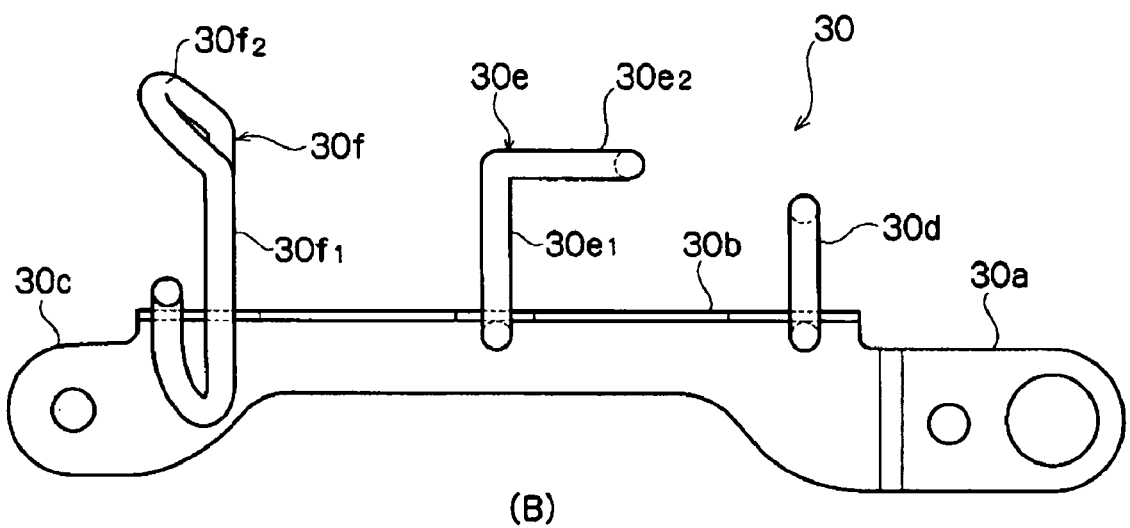

As shown in FIG. 5 and FIGS. 6(A) and 6(B), the reservoir tank 17 is provided, at the upper end, with a cylindrical cooling water filler port 17*a*. To the cooling water filler port 17*a* is attached a cap 17*b* for closing or opening the cooling water filler port 17*a*. The cooling water filler port 17*a* is provided, at its side, with a second connection section 17*c*. To the second connection section 17*c* is fastened one end of an atmospheric discharge hose 19. The other end of the atmospheric discharge hose 19 includes an opening 19*a* open to the atmosphere.

A first mounting section 17*d* is provided at the upper end of the reservoir tank 17 and forward of the cooling water filler port 17*a*. A second mounting section 17*e* is provided at the rear end of the reservoir tank 17. Further, at the lower end of the reservoir tank 17 and behind the first connection section 17*f* is a projection 17*g*.

To the first mounting section 17*d* provided on the reservoir tank 17 is mounted a first bracket 30 (see FIGS. 6(A) and (B)). The first bracket 30 is an example of the "mounting member." As shown in FIGS. 6(A) and 6(B), the first bracket 30 is provided with a tank side plate-like section 30*a* to be connected to the first mounting section 17*d* of the reservoir tank 17 with a bolt or other suitable fastening member. To the tank side plate-like section 30*a* is connected one end of a body section 30*b* extending vertically when assembled to the reservoir tank 17. The body section 30*b* is provided with a first guide section 30*d* for positioning (fixing) the feed and drainage pipe 20. Also, the body section 30*b* is provided with a second guide section 30*e* for positioning (fixing) the feed and drainage pipe 20 and located further upward than the first guide section 30*d*. Further, the body section 30*b* is provided with a third guide section 30*f* for positioning (fixing) the feed and drainage pipe 20 and located further upward than the second guide section 30*e*. Specifically, the second guide section 30*e* is made up of a hollow, perpendicular guide section 30*e*1 extending approximately in the direction perpendicular to the body section 30*b*, and a hollow, parallel guide section 30*e*2 extending approximately in the direction parallel to the body section 30*b*. The third guide section 30*f* is made up of a hollow, guide section body 30*f*1 extending approximately in the direction perpendicular to the body section 30*b*, and a hollow, slanting end section 30*f*2 inclined to the guide section body 30*f*1. Further, the body section 30*b* is provided with an insertion hole 30*b*1 for a convex section 42*c* of a support piece 42*b* (described later) to be press fitted therein.

Figure 3:
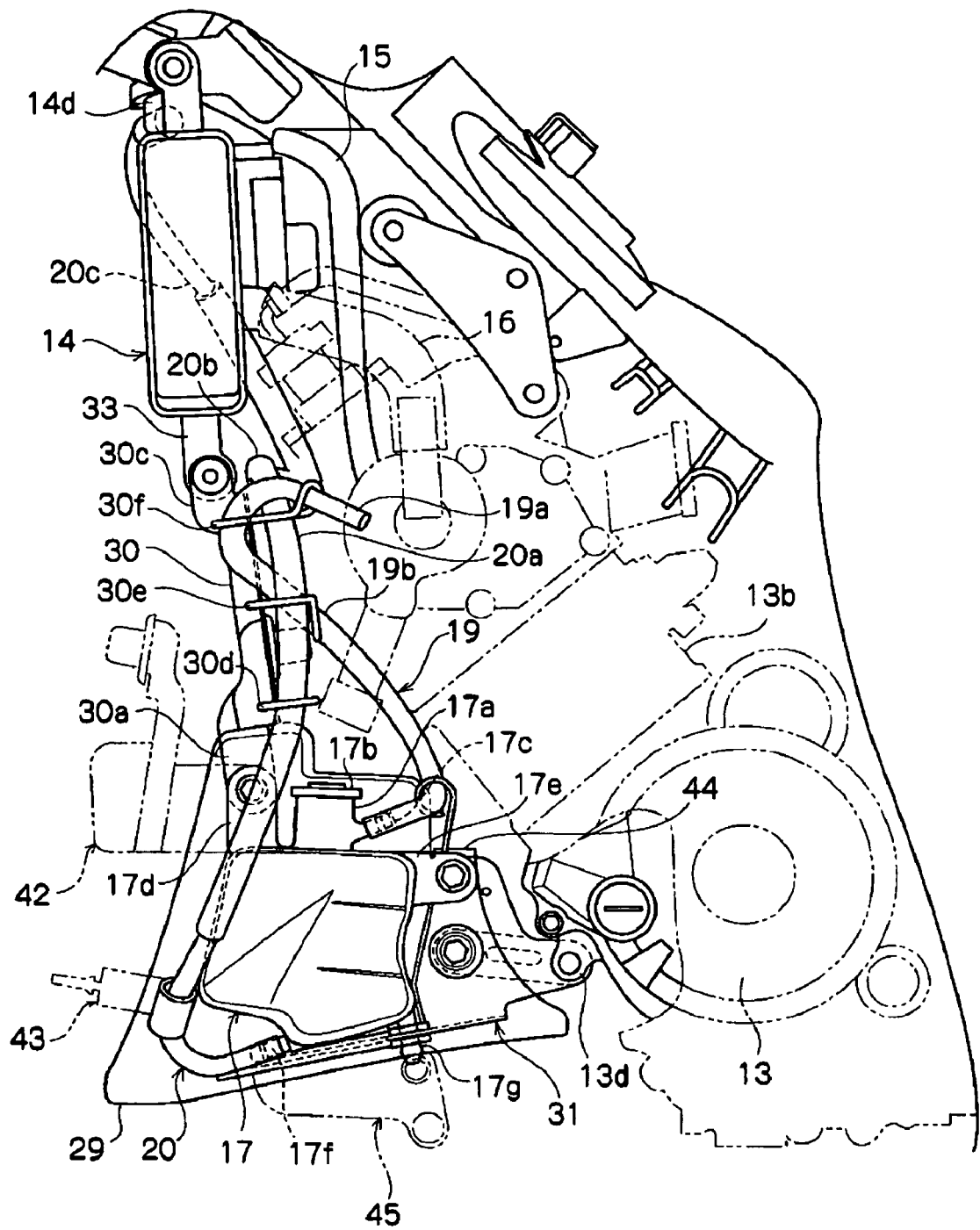
FIG. 3 is a side view of a portion around an engine of the motorcycle according to the preferred embodiment shown in FIG. 1.

Of the plurality of guide sections 30*d*, 30*e*, and 30*f*, the second guide section 30*e* and the third guide section 30*f* are adapted to position the atmospheric discharge hose 19 as well as the feed and drainage pipe 20 at the same time. To the other end of the body section 30*b* is connected a frame side plate-like section 30*c*. The frame side plate-like section 30*c* is connected to a mounting piece 33 (see FIG. 3) provided on the radiator 14 at the lower end, with a bolt or the like.

Figure 7:
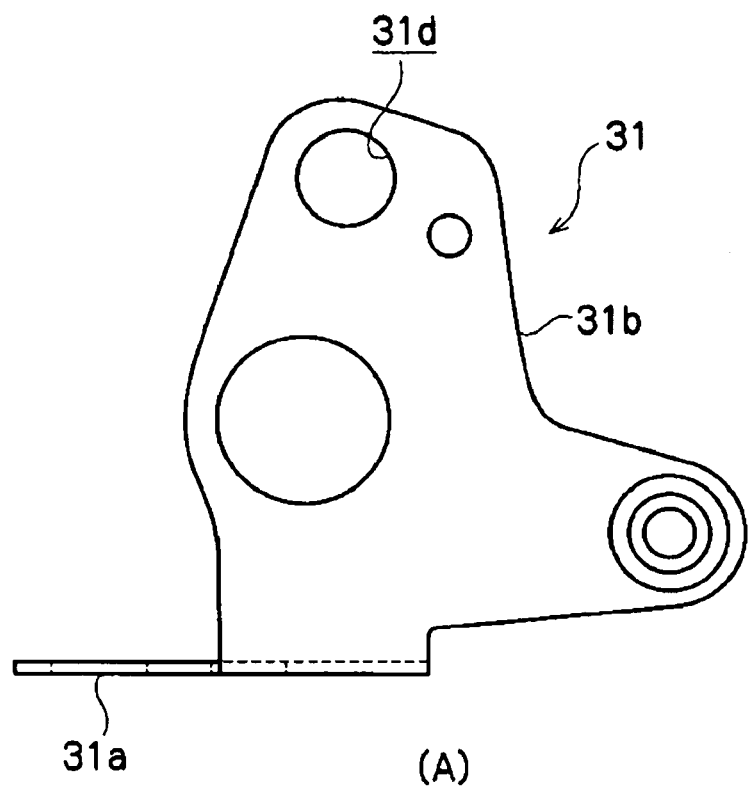
FIG. 7(A) is a plan view of a second bracket for the attachment of the reservoir tank to the vehicle body of the motorcycle according to the preferred embodiment shown in FIG. 1.
FIG. 7(B) is a side view of the second bracket.
Figure 7:
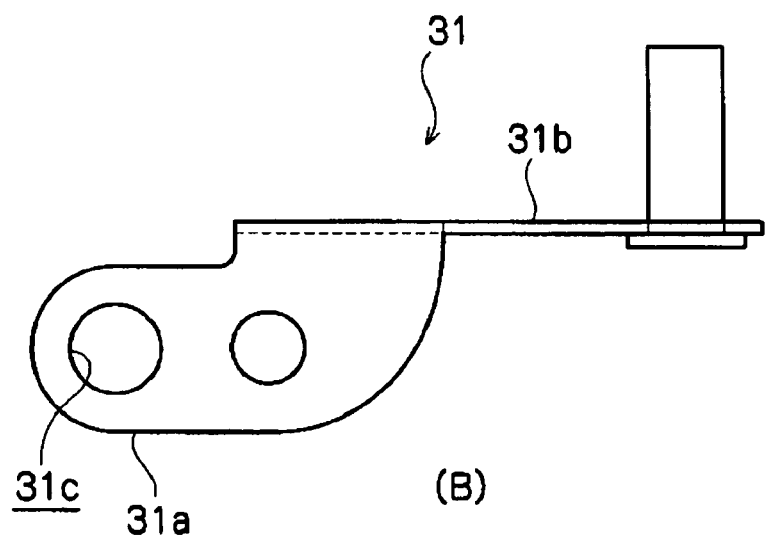

A second bracket 31 (see FIG. 7) is mounted to the second mounting section 17*e* provided on the reservoir tank 17. The second bracket 31 is also an example of a "mounting member." As shown in FIG. 7, the second bracket 31 is provided with an insertion support piece 31*a* provided with an insertion hole 31*c* for the projection 17*g* to be inserted therein. The insertion support piece 31*a* is integral with a connection support piece 31*b* extending approximately in the direction perpendicular to the insertion support piece 31*a* and connected to the second mounting section 17*e* of the reservoir tank 17 with a bolt or the like. The connection support piece 31b is provided with a mounting hole 31d for a bolt or the like to be inserted therein during assembly to the mounting section 13d of the engine 13.

As shown in FIG. 1 and FIG. 2, the feed and drainage pipe 20 is connected to the first connection section 17f of the reservoir tank 17, and the feed and drainage pipe 20 passes in front of the reservoir tank 17 to be inserted into the first guide section 30d, second guide section 30e, and third guide section 30f of the first bracket 30. As a result of the feed and drainage pipe 20 being inserted in the first guide section 30d, second guide section 30e, and third guide section 30f, the feed and drainage pipe 20 is positioned. Also, the feed and drainage pipe 20, after being inserted in the third guide section 30f, passes under the radiator 14, goes to the left with respect to the body center line when viewed from the front of the vehicle body and connects to the cap section 14d of the radiator 14. As such, the feed and drainage pipe 20 is made up of a first vertical section 20a located in the vicinity of the reservoir tank 17 which is inserted into the guide sections 30d, 30e, 30f and extending approximately vertically, a horizontal section 20b extending downward of the radiator 14 approximately horizontally, and a second vertical section 20c extending approximately vertically on the left side of the radiator 14 when viewed from the front of the vehicle body.

To the second connection section 17c of the reservoir tank 17 is connected the atmospheric discharge hose 19, and after being inserted in the parallel guide section 30e2 of the second guide section 30e, is inserted into the perpendicular guide section 30e1. The atmospheric discharge hose 19, after being inserted in the perpendicular guide section 30e1 of the second guide section 30e, is inserted into the guide section body 30f1 of the third guide section 30f and further into the slanting end section 30f2. As such, the atmospheric discharge hose 19 is positioned by the guide sections 30e, 30f. In particular, the opening 19a of the atmospheric discharge hose 19 is positioned by the slanting end section 30f2, that is, the opening 19a is positioned by the slanting end section 30f2 in the state of opening rearward and downward of the vehicle body.

The opening 19a of the atmospheric discharge hose 19 and the feed and drainage pipe 20 are positioned (fixed) by common fixing members such as the second guide section 30e and the third guide section 30f. Therefore, the opening 19a of the atmospheric discharge hose 19 and its halfway region 19b extending to the opening 19a are located in the vicinity of the feed and drainage pipe 20. In other words, the lower portion of the first vertical section 20a of the feed and drainage pipe 20 is at a position in the vicinity of the reservoir tank 17, and the opening 19a of the atmospheric discharge hose 19 is located in the vicinity of the upper portion of the first vertical section 20a.

Figure 8:
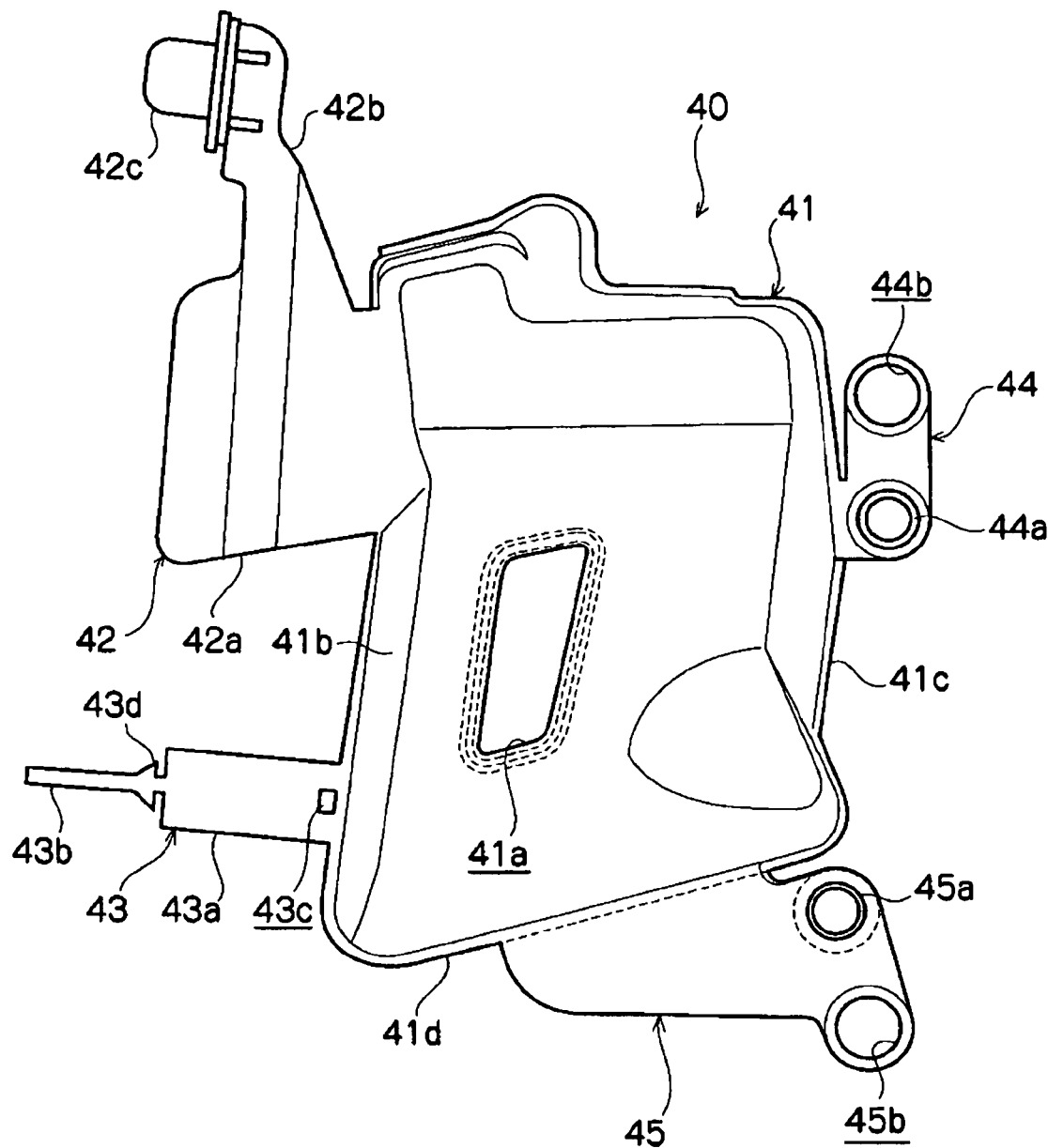
FIG. 8 is a plan view of a cover member used in the motorcycle according to the preferred embodiment shown in FIG. 1.
Figure 9:
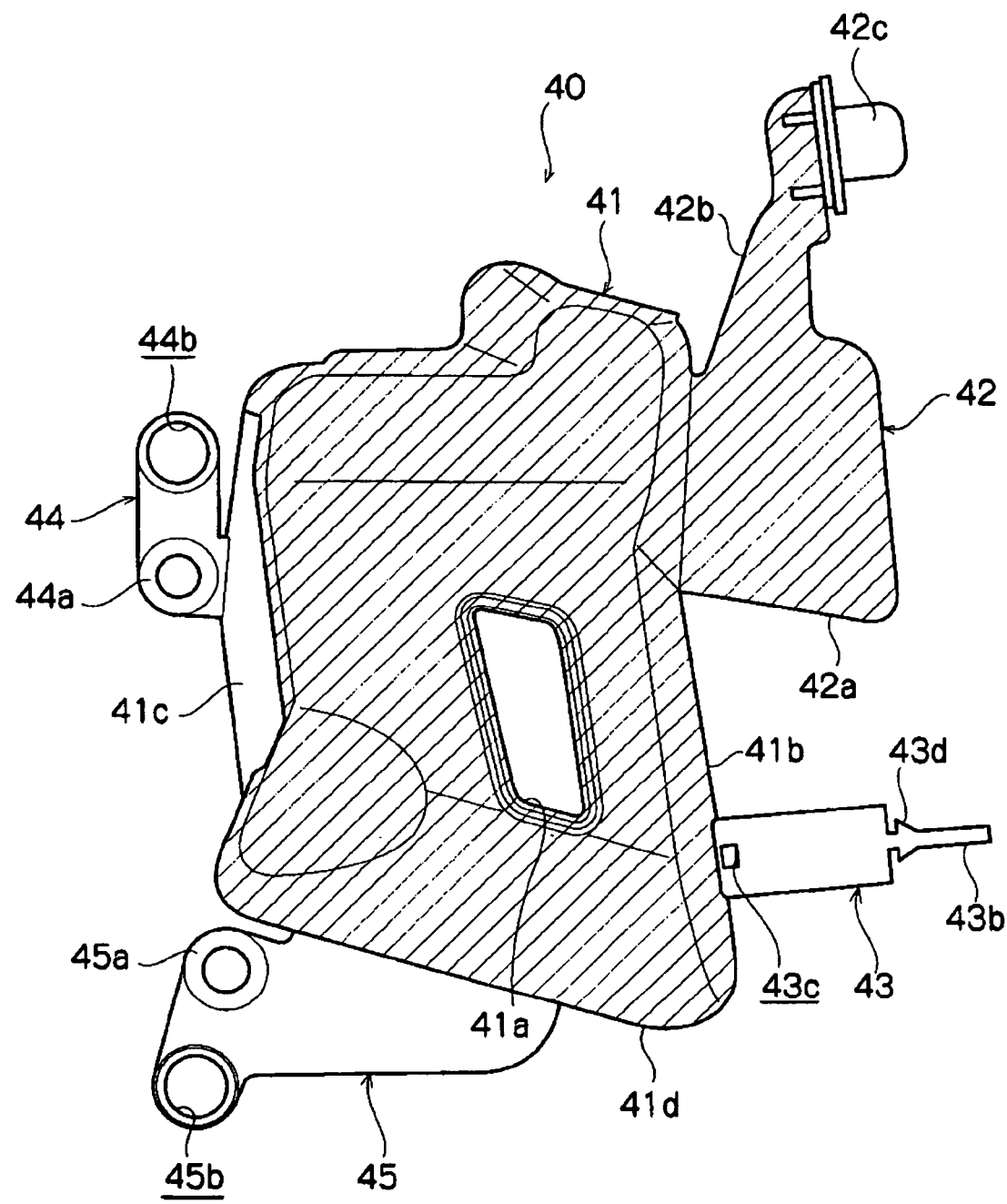
FIG. 9 is a rear view of the cover member used in the motorcycle according to the preferred embodiment shown in FIG. 1.

At least a portion of the surface of the reservoir tank 17 is covered by a cover member 40 (see FIG. 8 and FIG. 9). As shown in FIG. 8 and FIG. 9, the cover member 40 is provided with a flexible cover body section 41 covering at least a portion of the surface of the reservoir tank 17. The cover body section 41 is provided with a checking hole 41a for checking the remaining amount of cooling water in the reservoir tank 17 when the cover member 40 is mounted to the reservoir tank 17. The checking of the remaining amount of cooling water is not limited to the checking hole 41a. A cutout or the like may be provided, in the cover body section 41 so that at least a portion of the surface of the reservoir tank 17 is exposed.

Also, a first bending piece 42 is integral with the cover body section 41, directed outward from the edge portion of a first side surface 41b of the cover body section 41. The first bending piece 42 extends outward along the die separating plane of the cover member 40. The first bending piece 42 is provided with a plate-like first bending piece body section 42a. Also, the first bending piece 42 is provided with a support piece 42b integral with the first bending piece body section 42a and having the convex section 42c to be press fitted in the insertion hole 30b1 of the body section 30b of the first bracket 30. The first bending piece body section 42a and support piece 42b are arranged so as to be bent at an angle larger than 90 degrees.

Also, a second bending piece 43 is integral with the cover body section 41 and directed outward from the edge portion of a first side surface 41b of the cover body section 41. The second bending piece 43 extends outward along the die separating plane of the cover member 40. The second bending piece 43 is provided with a bendable second bending piece body section 43a. The second bending piece body section 43a is provided with a fitting hole 43c. Also, the second bending piece 43 is provided with a fitting piece 43b integral with the second bending piece body section 43a at the forward end for insertion into the fitting hole 43c. The fitting piece 43b is provided with a catch section 43d to be caught in the fitting hole 43c. As a result of the catch section 43d being caught in the fitting hole 43c, a condition can be maintained in which the fitting piece 43b is inserted in the fitting hole 43c. The second bending piece body section 43a and fitting piece 43b are arranged so as to be bent at an angle larger than 90 degrees.

Also, a third bending piece 44 is integral with the cover body section 41 and directed outward from the edge portion of a second side surface 41c of the cover body section 41. The third bending piece 44 extends outward along the die separating plane of the cover member 40. The third bending piece 44 is arranged in a plate-like shape. Also, the third bending piece 44 is provided, at one end, with a cylindrical section 44a, and at the other end, with an insertion opening 44b into which is inserted the cylindrical section 44a. The third bending piece 44 is arranged such that it is bent approximately centrally at an angle larger than about 90 degrees (for example, about 180 degrees), and the cylindrical section 44a is inserted in the insertion opening 44b to be engaged therewith.

Also, a fourth bending piece 45 is integral with the cover body section 41 and directed outward from the edge portion of a third side surface 41d of the cover body section 41. The fourth bending piece 45 extends outward along the die separating plane of the cover member 40. The fourth bending piece 45 is arranged in a plate-like shape and is larger than the surface area of the third bending piece 44. The fourth bending piece 45 is provided at one end with a cylindrical section 45a and an insertion opening 45b, in the vicinity of the cylindrical section 45a, for the cylindrical section 45a to be inserted therein. The fourth bending piece 45 is arranged such that it is bent approximately centrally at an angle larger than 90 degrees (for example, 180 degrees), and the cylindrical section 45a is inserted in the insertion opening 45b to be engaged therewith.

Now, a method is described of mounting the foregoing cover member 40 to the reservoir tank 17.

Figure 10:
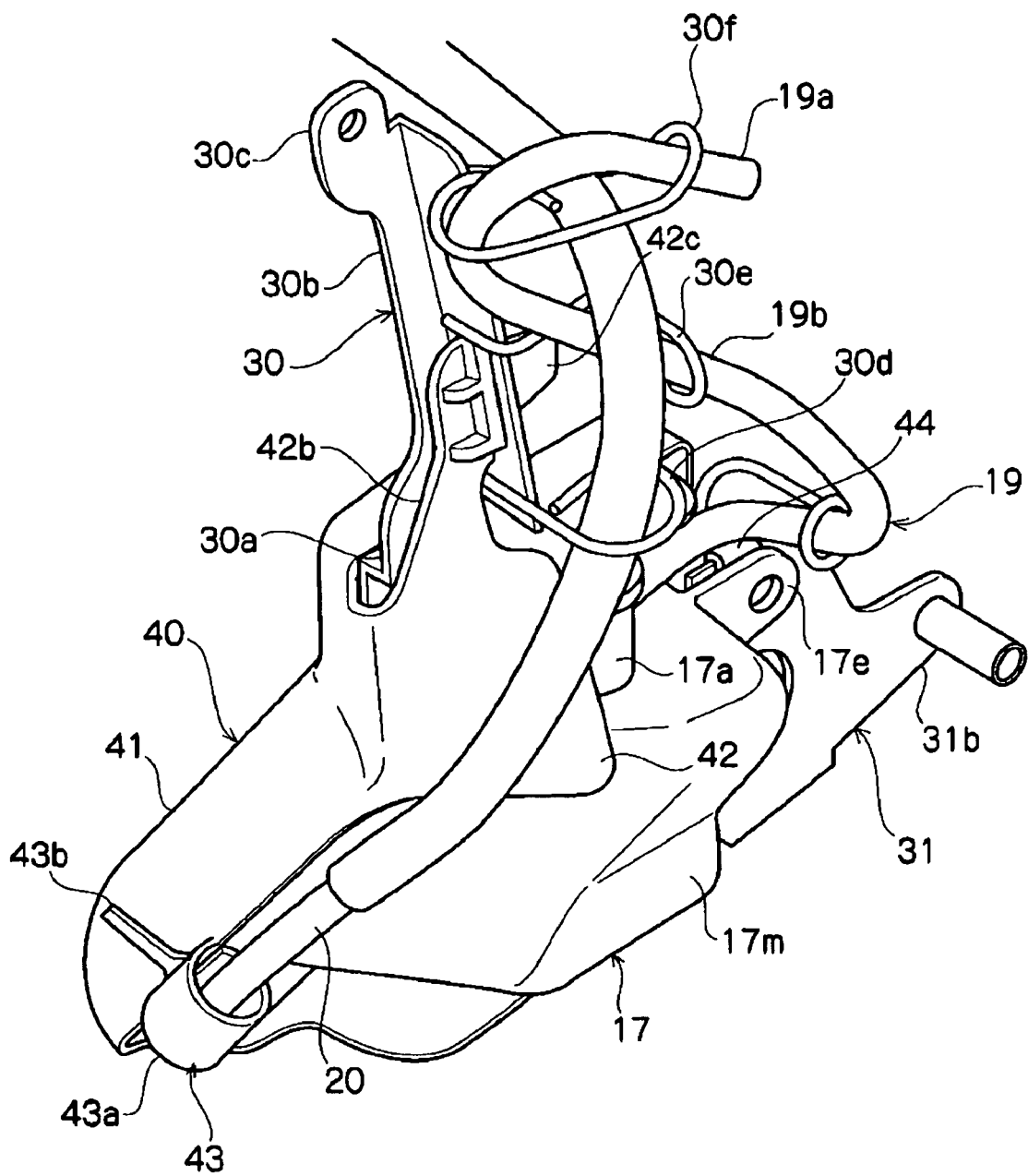
FIG. 10 is a perspective view showing a reservoir tank of the motorcycle according to the preferred embodiment shown in FIG. 1, with the cover member mounted thereon.
Figure 11:
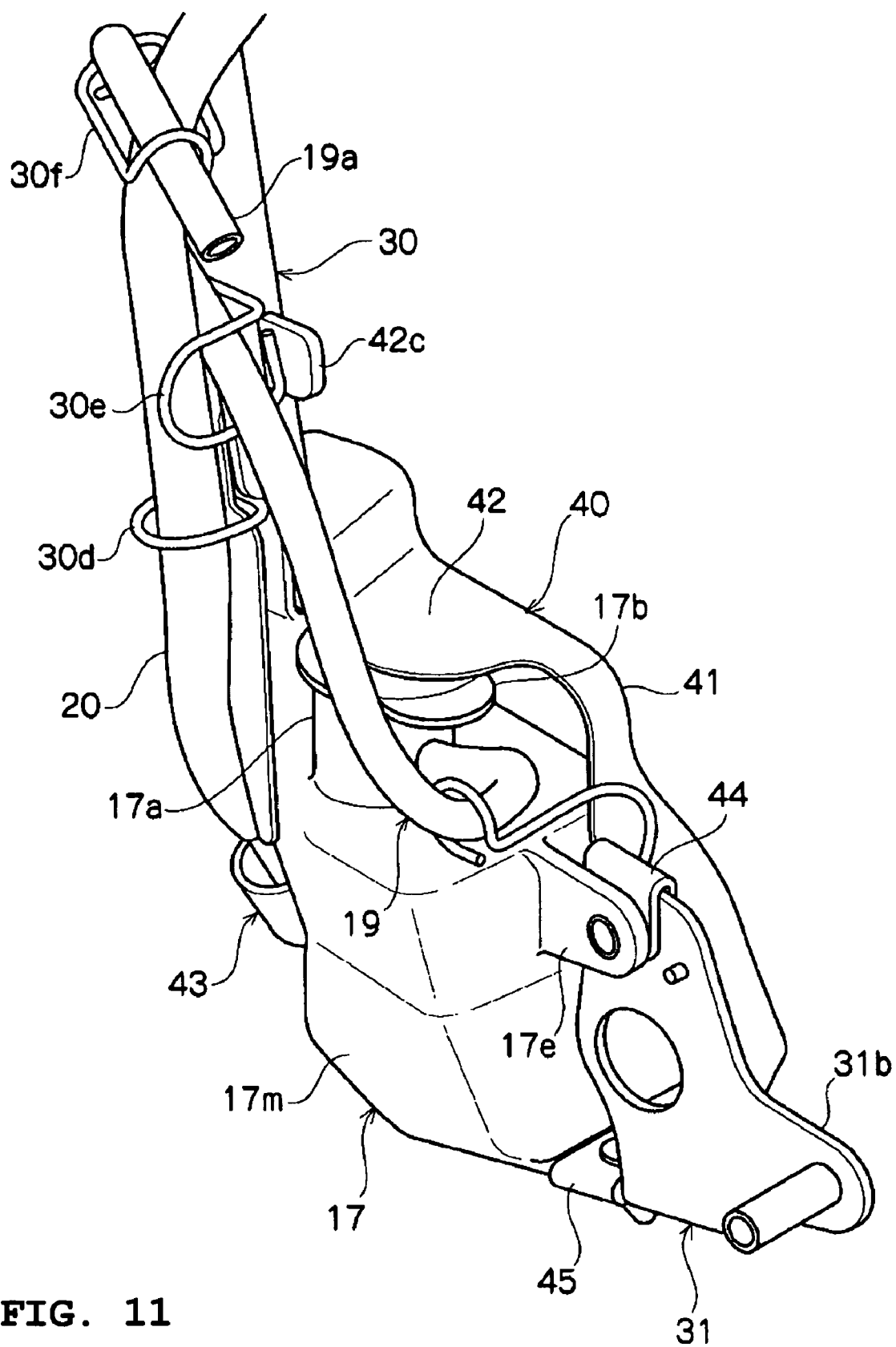
FIG. 11 is a perspective view showing the reservoir tank of the motorcycle according to the preferred embodiment shown in FIG. 1, with the cover member mounted thereon, and viewed in the direction at a different angle than that of FIG. 10.
Figure 12:
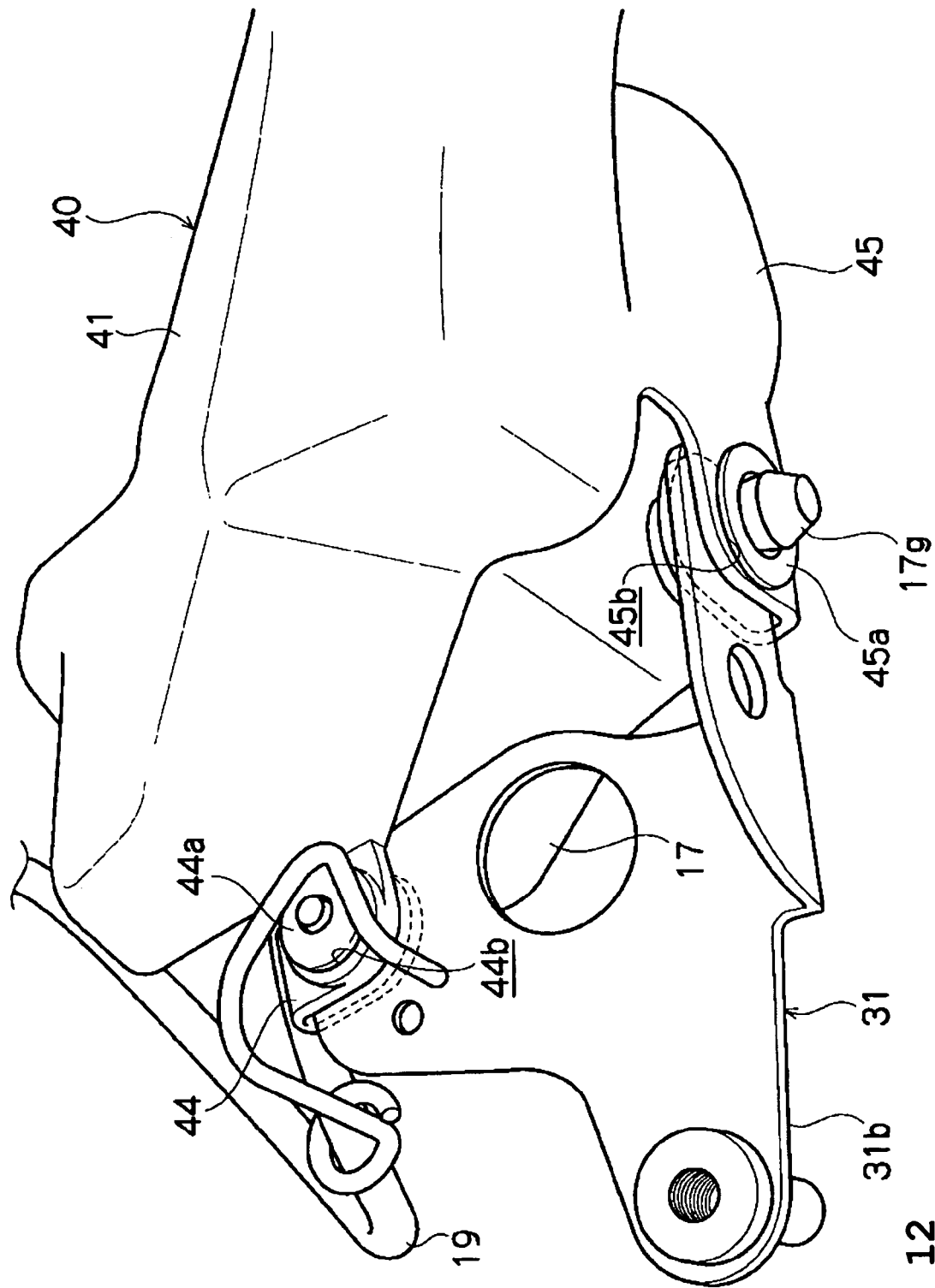
FIG. 12 is a partial perspective view showing the reservoir tank and a second bracket joined together.

As shown in FIG. 10 through FIG. 12, when the second bracket 31 is mounted to the second mounting section 17e of the reservoir tank 17, the cylindrical section 45a of the fourth bending piece 45 is inserted into the insertion hole 31c provided in the insertion support piece 31a from one side surface of the insertion support piece 31a of the second bracket 31, with the surface of the reservoir tank 17 covered by the cover body section 41. Then, the fourth bending piece 45 is bent at approximately 180 degrees and the insertion opening 45b of the fourth bending piece 45 is inserted into the cylindrical section 45a from the other side surface of the insertion support piece 31a such that it is located over the insertion hole 31c. Thus, the cylindrical section 45a and the insertion opening 45b of the fourth bending piece 45 are engaged with each other. At this time, the insertion support piece 31a of the second bracket 31 is being held, at both side surfaces, by the fourth bending piece 45, and both of the side surfaces of the insertion support piece 31a are in contact with the fourth bending piece 45. Therefore, the projection 17g provided on the reservoir tank 17 is inserted in the insertion hole 31c, with the insertion support piece 31a held, at both side surfaces, by the fourth bending piece 45.

Also, a cylindrical section 44a of the third bending piece 44 is inserted into a mounting hole 31d provided in the connection support piece 31b from one side surface of the connection support piece 31b of the second bracket 31, with the surface of the reservoir tank 17 covered by the cover body section 41. The third bending piece 44 is bent at approximately 180 degrees and is inserted into the cylindrical section 44a from the other side surface of the connection support piece 31b such that an insertion opening 44b of the third bending piece 44 is located over the mounting hole 31d. Thus, the cylindrical section 44a and the insertion opening 44b of the third bending piece 44 are engaged with each other. At this time, the connection support piece 31b of the second bracket 31 is being held, at both side surfaces, by the third bending piece 44, and both of the side surfaces of the connection support piece 31b are in contact with the third bending piece 44. Therefore, a bolt or other suitable connecting member is passed through the mounting hole 17h of the second mounting section 17e of the reservoir tank 17 for connection with the connection support piece 31b held, at both side surfaces, by the third bending piece 44.

No special care is taken with respect to the mounting order of the third bending piece 44 and the fourth bending piece 45 of the cover member 40.

Also, the second bending piece 43 of the cover member 40 is bent around the feed and drainage pipe 20, and the fitting piece 43b is inserted into the insertion hole 43c. At this time, the catch section 43d provided on the fitting piece 43b is caught in the fitting hole 43c, so that the inserted condition of the fitting piece 43b in the fitting hole 43c is maintained. This allows positioning of the feed and drainage pipe 20.

Further, the first bending piece 42 is bent so as to follow the surface of the reservoir tank 17, and the convex section 42c of the support piece 42b is press fitted in the insertion hole 30b1 of the body section 30b of the first bracket 30.

As described above, a portion of the surface of the reservoir tank 17 can be covered by the cover member 40, and the cover member 40 can be fixed to the reservoir tank 17. At this time, since the first bending piece 42 covers the cap 17b attached to the cooling water filler port 17a of the reservoir tank 17, the first bending piece 42 will act as a cap cover. As a result, the cap 17b is prevented from becoming dirty, and when the cap is removed from the cooling water filler port 17a, dust or the like sticking to the cap 17b is prevented from entering the reservoir tank 17 from the cooling water filler port 17a.

Further, as shown in FIG. 1 and FIG. 2, the motorcycle 1 is provided with an exhaust pipe 21 having one end connected to the cylinder 13b of the engine 13, the exhaust pipe 21 being bent toward the left when viewed from the front and extending rearward. That is, the exhaust pipe 21 is disposed on the opposite side from the reservoir tank 17, which is disposed on the right side with respect to the body center line. To the other end of the exhaust pipe 21 is connected a muffler 22.

The rear arm bracket 4 connected to the main frame 3 is provided with a pivot shaft 23. The rear arm 24 is pivoted at its forward end by the pivot shaft 23 for up and down swinging movement. A rear wheel 25 is mounted to the rear end of the rear arm 24 for rotation. A seat 26 is disposed upwardly of the seat rail 5. Also, a body cover 27 is attached to the vehicle body from a forward portion to a rear portion thereof so as to cover the head pipe 2 and the seat rail 5. Behind the body cover 27 in the running direction (in the direction of arrow FWD in FIG. 1) is mounted a rear fender 28 covering the rear wheel thereabove.

Figure 4:
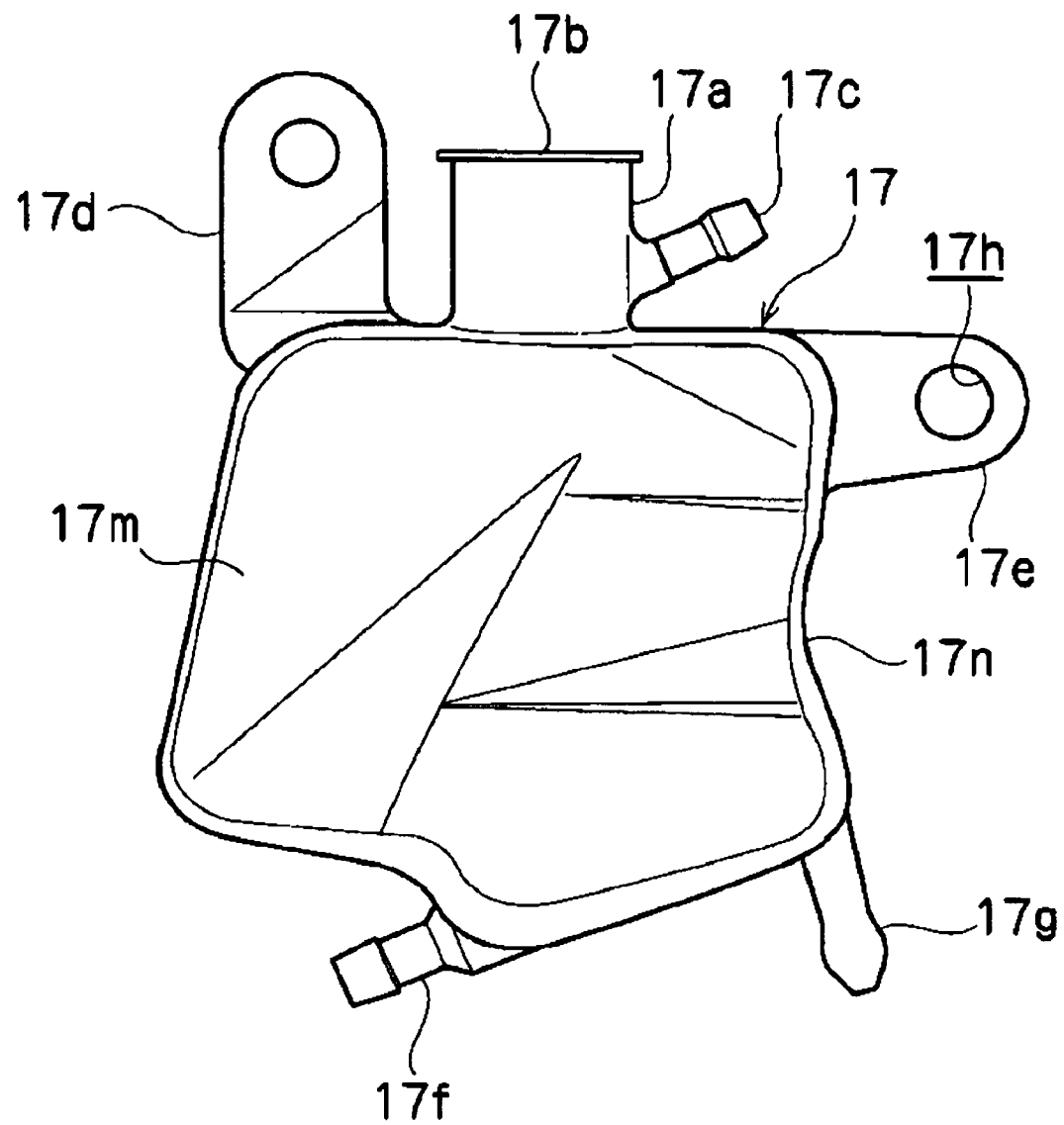
FIG. 4 is a left side view of a reservoir tank used in the motorcycle according to the preferred embodiment shown in FIG. 1.

Forwardly of the body cover 27 is provided a pair of leg shields 29, for covering the driver's legs at the front thereof, spaced at a given distance in the lateral direction of the vehicle body (in the direction of arrow A in FIG. 2). The pair of leg shields 29 is disposed on both sides of the radiator 14 and reservoir tank 17 such that they hold the radiator 14 and reservoir tank 17 therebetween from both sides. That is, the radiator 14 and reservoir tank 17 are disposed inside the leg shields 29 such that they are covered by the leg shields 29 when viewed in the lateral direction. Also, the reservoir tank 17 is disposed in front of the engine 13 and along the inside surface of one leg shield 29. Further, the outside surface 17s (see FIG. 5) of the reservoir tank 17, on the opposite side from the surface 17m facing the leg shield (see FIG. 4 and FIG. 10), is covered by the foregoing cover member 40. The tank-side opposed section 29b (see FIG. 2) of the leg shield 29 facing the reservoir tank 17 is arranged such that it can be removed, with the reservoir tank 17 left behind on the vehicle body. Here, the "vehicle body" includes the engine 13 or any portion of the body frame, for example, and the same applies hereinafter.

Further, as shown in FIG. 2, the leg shield 29 has an opening 29a at the front thereof. The radiator 14 inside the leg shield 29 is disposed such that substantially all the front area of a core section 14c is exposed through the opening 29a of the leg shield 29 when viewed from the front, and the upper portion of the core section 14c is at a position above the front fender 9. Also, the reservoir tank 17 inside the leg shield 29 is disposed at a position where it can be visually recognized from the front through the opening 29a of the leg shield 29. That is, the opening 29a of the leg shield 29 is provided such that the upper portion of the reservoir tank 17 is partially exposed.

As described above, since in the present preferred embodiment, the first bending piece 42, second bending piece 43, third bending piece 44, and fourth bending piece 45 (hereinafter referred briefly to as "bending pieces 42, 43, 44, 45" as appropriate) of the cover member 40 extend outward from the edge portions of a cover body section 41, none of the bending pieces 42, 43, 44, 45 includes an undercut when the cover member 40 is made by forming dies. As a result, the structure of the forming dies can be simplified. Also, since the bending pieces 42, 43, 44, 45 are bendable, they can be utilized for other purposes if the bending pieces 42, 43, 44, 45 are used in the condition of being bent. Further, since the cover body section 41 is flexible, the reservoir tank 17 can be covered reliably regardless of its surface profile.

Further, since in the present preferred embodiment, the bending pieces 42, 43, 44, 45 are bent, the cover member 40 can be fixed to the reservoir tank 17 or the vehicle body, or position the feed and drainage pipe 20 attached to the reservoir tank 17. This provides the freedom of fixing the cover member 40 or positioning the feed and drainage pipe 20 by the bending pieces 42, 43, 44, 45.

Further, since in the present preferred embodiment, the bending angles of the bending pieces 42, 43, 44, 45 are larger than about 90 degrees, the object to be fixed or positioned can be fixed or positioned reliably even if it has a cylindrical shape.

Further, since in the present preferred embodiment, the condition in which the bending pieces 42, 43, 44, 45 are bent can be maintained, the fixed condition of the cover body section 41 or the position of the feed and drainage pipe 20 can be maintained.

Further, since in the present preferred embodiment, the bending pieces 44, 45 have cylindrical sections 44a, 45a and insertion openings 44b, 45b, respectively, bent conditions of the bending pieces 44, 45 can be maintained easily when these sections and openings are fitted together. Since the second bending piece 43 has the fitting piece 43b and fitting hole 43c, the bent condition of the second bending piece 43 can be maintained easily when the fitting piece 43b is inserted in the fitting hole 43c and caught by the catch section 43d.

Further, since in the present preferred embodiment, the first bending piece 42 serves additionally as a cap cover for covering the cap 17b provided on the cooling water filler port 17a of the reservoir tank 17, the first bending piece 42 can be utilized as a cap cover. As a result, no separate cap cover is needed, reducing the number of parts.

Further, since in the present preferred embodiment, the convex section 42c of the support piece 42b of the first bending piece 42 is press fitted in the insertion hole 30b1 of the body section 30b of the first bracket 30, the bent condition of the first bending piece 42 can be maintained easily and reliably.

Further, in the present preferred embodiment, the cylindrical sections 44a, 45a of the bending pieces 44, 45 are inserted, from one side of the second bracket 31, into the mounting hole 31d and insertion hole 31c provided in the second bracket 31 by which the reservoir tank 17 is mounted to the vehicle body, respectively. The insertion openings 44b, 45b are engaged with the cylindrical sections 44a, 45a from the other side of the second bracket 31, with the cylindrical sections 44a, 45a inserted in the mounting hole 31d and insertion hole 31c. Therefore, the cover member 40 can be fixed to the second bracket 31 reliably by using bending pieces 44, 45, and other special fixing members are dispensed with. As a result, the number of parts and manufacturing costs can be reduced.

Further, since in the present preferred embodiment, the cylindrical sections 44a, 45a and insertion openings 44b, 45b are made from elastic material (for example, rubber), if a vibration occurs, it can be absorbed by the cylindrical sections 44a, 45a and insertion openings 44b, 45b. As a result, a vibration prevention function is imparted to the bending pieces 44, 45 and no separate grommets need to be provided.

Further, since in the present preferred embodiment, the reservoir tank 17 is disposed along the inside surface of the leg shield 29, the leg shield side opposed surface 17m (see FIG. 4 and FIG. 10) of the reservoir tank 17 is covered by the leg shield 29. Therefore, the leg shield side opposed surface 17m need not be covered by the cover member 40. The surface area of the reservoir tank 17 required to be covered by the cover member 40 is decreased in this way, thereby simplifying the shape (configuration) of the cover member 40. As a result, the structure of forming dies for use in making the cover member 40 can be simplified.

Further, since in the present preferred embodiment, the tank-side opposed surface 17n (see FIG. 4 and FIG. 5) of the reservoir tank 17 facing the engine 13 is at a position in front of the engine 13, it is covered by the engine 13. Therefore, the tank-side opposed surface 17n of the reservoir tank 17 need not be covered by the cover member 40 and the surface area of the reservoir tank 17 required to be covered by the cover member 40 is decreased, thereby simplifying the shape (configuration) of the cover member 40. As a result, the structure of forming dies for use in making the cover member 40 can be simplified.

Also, since the reservoir tank 17 can be visually recognized from the front through the opening 29a of the leg shields 29, the remaining amount of liquid in the reservoir tank 17 can be easily checked. Also, when maintenance work is necessary for the reservoir tank 17, the reservoir tank 17 can be visually recognized from the front through the opening 29a of the leg shields 29 and the maintenance work of the reservoir tank 17 can be performed through the opening 29a of the leg shields 29.

Further, since a checking hole 41a is provided in the cover member 40, the remaining amount of liquid in the reservoir tank 17 can be easily checked.

Also, since in the present preferred embodiment, the reservoir tank-side opposed section 29b (see FIG. 2) of the leg shield 29 can be removed, with the reservoir tank 17 left behind on the vehicle body, maintenance work of the reservoir tank 17 can be performed and the remaining amount of liquid in the reservoir tank 17 can be easily checked.

The disclosed present preferred embodiment is to be taken as an example in all respects and it is to be understood that the present invention is not limited to the present preferred embodiment. The scope of the present invention is defined by the appended claims rather than by the description of the present preferred embodiment, further including all changes that fall within the metes and bounds of the claims or equivalents thereof.

For example, although in the foregoing preferred embodiment an underbone type motorcycle 1 having a low main frame is shown, the present invention is not limited to that. The present invention may be applied to other vehicles in addition to the motorcycle 1, such as three wheelers and ATVs (All Terrain Vehicles: off-road vehicles) if they are of an underbone type provided with a heat exchanger for cooling the engine 13.

Further, although in the foregoing preferred embodiment an example is shown in which the first bracket 30 and second bracket 31 are independent members separate from the reservoir tank 17, the present invention is not limited to that. For example, the first bracket 30 and second bracket 31 may be integral with the reservoir tank 17. This allows a significant reduction in the number of parts as well as in assembly man-hours.

Further, although in the foregoing preferred embodiment an example is shown in which the first bracket 30 is integral with the first guide section 30d, second guide section 30e, and third guide section 30f, the present invention is not limited to that. For example, at least one of the first guide section 30d, second guide section 30e, and third guide section 30f may be an independent member separate from the first bracket 30 and attached to the first bracket 30.

Further, although in the foregoing preferred embodiment an example is shown in which the reservoir tank 17 is mounted to the vehicle body with the first bracket 30 and second bracket 31, the present invention is not limited to that. For example, the reservoir tank 17 may be mounted to the vehicle body with a single bracket (not shown), or with three or more brackets.

Further, although in the foregoing preferred embodiment an example is shown in which the feed and drainage pipe 20 and atmospheric discharge hose 19 attached as on-the-vehicle parts to the reservoir tank 17 are positioned with common guide sections 30d, 30e, and 30f, the present invention is not limited to that. For example, a plurality of electric wires (not shown) connected to a battery (not shown) as an on-the-vehicle part may be fixed by common fixing members (not shown).

Although in the foregoing preferred embodiment an example is shown in which the first bracket 30 and second bracket 31 are assembled to the reservoir tank 17, the present invention is not limited to that. For example, each of the first bracket 30 and second bracket 31 may be large sized which are assembled directly to each other and the reservoir tank is mounted to the vehicle body with these assembled brackets.

Although, in the foregoing preferred embodiment, the reservoir tank 17 is preferably made from a semitransparent material, the present invention is not limited to that. The reservoir tank 17 may be made from a material other than the semitransparent material, if it has at least in a portion, a transparent section allowing visual recognition from the outside of the amount of cooling water in the reservoir tank 17.

Further, although in the foregoing preferred embodiment an example is shown in which the cover member 40 is provided with four bending pieces 42, 43, 44, 45, the present invention is not limited to that. The number of bending pieces may be increased or decreased.

Further, although in the foregoing preferred embodiment an example is shown in which the third bending piece 44 and fourth bending piece 45 are provided with cylindrical sections 44*a*, 45*a* and insertion openings 44*b*, 45*b*, the present invention is not limited to that. For example, the third bending piece 44 and fourth bending piece 45 may be provided with at least one of cylindrical sections 44*a*, 45*a* and insertion openings 44*b*, 45*b*, and the other may be provided in the cover body section 41 or on-the-vehicle part, or on the vehicle body.

Although an example is shown in which the second bending piece 43 is provided with both the fitting piece 43*b* and fitting hole 43*c*, the present invention is not limited to that. The second bending piece 43 may be provided with one of the fitting piece 43*b* and the fitting hole 43*c*, and the other may be provided in the cover body section 41 or on-the-vehicle part, or on the vehicle body.

Further, although in the foregoing preferred embodiment an example is shown of the reservoir tank 17 as a on-the-vehicle tank, the present invention is not limited to that. The present invention may be applied to other tanks such as fuel tanks or oil tanks if they have a cap.

Further, although in the foregoing preferred embodiment is shown an arrangement in which the convex section 42*c* of the support piece 42*b* and the first bending piece 42 is press fitted in the insertion hole 30*b*1 of the body section 30*b* of the first bracket 30, the present invention is not limited to that. For example, a concave section may be provided in the support piece 42*b* of the first bending piece 42 and a convex section on the body section 30*b* of the first bracket 30, so that the convex section is press fitted in the concave section.

While the present invention has been described with respect to preferred embodiments, it will be apparent to those skilled in the art that the disclosed invention may be modified in numerous ways and may assume many embodiments other those specifically set out and described above. Accordingly, it is intended by the appended claims to cover all modifications of the present invention which fall within the true spirit and scope of the invention.

What is claimed is:

1. A vehicle comprising:
a tank arranged to retain a liquid therein;
a mounting member arranged to mount the tank to the vehicle; and
a cover member including:
a flexible cover body section arranged to cover at least a portion of the tank; and
a bendable elongated section extending outward from an edge portion of the cover body section; wherein
the bendable elongated section is attached to the mounting member; and
further comprising a second elongated section arranged to bend and attach the cover body section to a vehicle body or position a connection member attached to the tank.

2. The vehicle as set forth in claim 1, wherein the bendable elongated section has at least one of an attaching section and a section arranged to receive an attaching section.

3. The vehicle as set forth in claim 1, wherein the bendable elongated section has an engagement section arranged to engage the mounting member with which the tank is mounted to the vehicle.

4. A vehicle comprising:
a tank arranged to retain a liquid therein;
a mounting member arranged to mount the tank to the vehicle; and
a cover member including:
a flexible cover body section arranged to cover at least a portion of the tank; and
a bendable elongated section extending outward from an edge portion of the cover body section; wherein
the bendable elongated section is attached to the mounting member; and
a bend angle of the bendable elongated section is larger than about 90 degrees.

5. The vehicle as set forth in claim 4, wherein the bendable elongated section has at least one of an attaching section and a section arranged to receive an attaching section.

6. The vehicle as set forth in claim 4, wherein the bendable elongated section has an engagement section arranged to engage the mounting member with which the tank is mounted to the vehicle.

7. A vehicle comprising:
a tank arranged to retain a liquid therein;
a mounting member arranged to mount the tank to the vehicle; and
a cover member including:
a flexible cover body section arranged to cover at least a portion of the tank; and
a bendable elongated section extending outward from an edge portion of the cover body section; wherein
the bendable elongated section is attached to the mounting member; and
the bendable elongated section has a bend maintaining section arranged to maintain a bent condition of the bendable elongated section.

8. The vehicle as set forth in claim 7, wherein the bendable elongated section has at least one of an attaching section and a section arranged to receive an attaching section.

9. The vehicle as set forth in claim 7, wherein the bendable elongated section has an engagement section arranged to engage the mounting member with which the tank is mounted to the vehicle.

10. A vehicle comprising:
a tank arranged to retain a liquid therein;
a mounting member arranged to mount the tank to the vehicle; and
a cover member including:
a flexible cover body section arranged to cover at least a portion of the tank; and
a bendable elongated section extending outward from an edge portion of the cover body section; wherein the bendable elongated section is attached to the mounting member; and a portion of the bendable elongated section is a cap cover arranged to cover a cap provided on the tank.

11. The vehicle as set forth in claim 10, wherein the bendable elongated section has at least one of an attaching section and a section arranged to receive an attaching section.

12. The vehicle as set forth in claim 10, wherein the bendable elongated section has an engagement section arranged to engage the mounting member with which the tank is mounted to the vehicle.

13. A vehicle comprising:

a tank arranged to retain a liquid therein;

a mounting member arranged to mount the tank to the vehicle; and a cover member including:

a flexible cover body section arranged to cover at least a portion of the tank; and a bendable elongated section extending outward from an edge portion of the cover body section; wherein the bendable elongated section is attached to the mounting member; and the bendable elongated section includes an insertion section arranged to receive the tank from one side of the mounting member, the insertion section arranged to be inserted into a hole of the mounting member, and a fixing section arranged to be engaged with the insertion section from the other side of the mounting member.

14. The vehicle as set forth in claim 13, wherein the insertion section and the fixing section are made of an elastic material.

15. The vehicle as set forth in claim 13, wherein the bendable elongated section has at least one of an attaching section and a section arranged to receive an attaching section.

16. The vehicle as set forth in claim 13, wherein the bendable elongated section has an engagement section arranged to engage the mounting member with which the tank is mounted to the vehicle.

17. A vehicle comprising:

a leg shield arranged to cover a driver's leg;

an on-the-vehicle part disposed inside the leg shield; and a cover member; wherein the on-the-vehicle part is disposed along an inside surface of the leg shield, and a surface of the on-the-vehicle part arranged on an opposite side from the side facing the leg shield is covered by the cover member; and the side of the on-the-vehicle part facing the leg shield is not directly connected to the leg shield.

18. A vehicle comprising:

a leg shield arranged to cover a driver's leg;

an on-the-vehicle part disposed inside the leg shield; and a cover member; wherein the on-the-vehicle part is disposed along an inside surface of the leg shield, and a surface of the on-the-vehicle part arranged on an opposite side from the side facing the leg shield is covered by the cover member; and the on-the-vehicle part is a tank arranged to store liquid and includes a transparent section allowing visual recognition of the liquid in the tank, the leg shield includes an opening on a front side, the tank is located at a position where the tank can be visually recognized from a front of the vehicle through the opening of the leg shield, and the cover member is provided with an exposed section exposing the transparent section of the tank.

19. The vehicle as set forth in claim 18, wherein the leg shield includes a detachable section exposing the tank, wherein the tank is left behind on the vehicle when the detachable section is detached from the leg shield.

* * * * *